(12) United States Patent
Tooker et al.

(10) Patent No.: US 11,254,193 B2
(45) Date of Patent: Feb. 22, 2022

(54) VEHICLE REAR SLIDER WINDOW ASSEMBLY WITH WATER DIVERTERS

(71) Applicant: Magna Mirrors of America, Inc., Holland, MI (US)

(72) Inventors: Troy F. Tooker, Holland, MI (US); Kyle S. Bowman, Holland, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 102 days.

(21) Appl. No.: 16/565,531

(22) Filed: Sep. 10, 2019

(65) Prior Publication Data

US 2020/0079187 A1    Mar. 12, 2020

Related U.S. Application Data

(60) Provisional application No. 62/729,439, filed on Sep. 11, 2018.

(51) Int. Cl.
*B60J 1/18* (2006.01)
*E06B 7/26* (2006.01)
*B60J 1/20* (2006.01)

(52) U.S. Cl.
CPC ............... *B60J 1/1853* (2013.01); *B60J 1/20* (2013.01); *E06B 7/26* (2013.01)

(58) Field of Classification Search
CPC ..... B60J 1/1846; B60J 1/1853; E06B 3/4618; E06B 3/4609; E06B 7/26
USPC .................................................... 296/146.16
See application file for complete search history.

(56) References Cited

U.S. PATENT DOCUMENTS

| | | |
|---|---|---|
| 4,920,698 A | 5/1990 | Friese et al. |
| 4,995,195 A | 2/1991 | Olberding et al. |
| 5,146,712 A | 9/1992 | Hlavaty |
| 5,531,046 A | 7/1996 | Kollar et al. |
| 5,551,197 A | 9/1996 | Repp et al. |
| 5,572,376 A | 11/1996 | Pace |
| 5,799,444 A | 9/1998 | Freimark et al. |
| 5,853,895 A | 12/1998 | Lewno |
| 5,996,284 A | 12/1999 | Freimark et al. |
| 6,026,611 A | 2/2000 | Ralston et al. |

(Continued)

FOREIGN PATENT DOCUMENTS

| | | |
|---|---|---|
| EP | 1048501 A1 | 11/2000 |
| KR | 20070003354 A * | 1/2007 |

(Continued)

*Primary Examiner* — D Glenn Dayoan
*Assistant Examiner* — Kevin P Weldon
(74) *Attorney, Agent, or Firm* — Honigman LLP

(57) ABSTRACT

A slider window assembly for a vehicle includes at least one fixed window panel and a movable window panel that is movable along an upper rail and a lower rail at the at least one fixed window panel between an opened position and a closed position. The lower rail includes a U-shaped channel and an attaching structure for attaching the lower rail at the at least one fixed window panel. The lower rail includes a plurality of water drainage channels established at the attaching structure and having an inlet at a wall of the U-shaped channel. A plurality of water diverters are established at the U-shaped channel and are configured to divert water flowing along the U-shaped channel toward the side of the channel along which respective inlets for respective water drainage channels are disposed.

18 Claims, 7 Drawing Sheets

(56) References Cited

U.S. PATENT DOCUMENTS

| | | | |
|---|---|---|---|
| 6,068,719 A | 5/2000 | Lewno | |
| 6,119,401 A | 9/2000 | Lin et al. | |
| 6,319,344 B1 | 11/2001 | Lewno | |
| 6,691,464 B2 | 2/2004 | Nestell et al. | |
| 6,846,039 B2 | 1/2005 | Lewno | |
| 6,868,689 B1 * | 3/2005 | McNeil | F24F 13/222 62/285 |
| 6,955,009 B2 | 10/2005 | Rasmussen | |
| 7,003,916 B2 | 2/2006 | Nestell et al. | |
| 7,073,293 B2 | 7/2006 | Galer | |
| 7,332,225 B2 | 2/2008 | Lewno | |
| 7,490,441 B2 * | 2/2009 | Burton | E06B 7/14 52/209 |
| 7,838,115 B2 | 11/2010 | Lewno | |
| 8,322,073 B2 | 12/2012 | Lewno | |
| 8,402,695 B2 * | 3/2013 | Smith | H01R 35/02 49/380 |
| 8,881,458 B2 | 11/2014 | Snider et al. | |
| 8,915,018 B2 | 12/2014 | Snider | |
| 10,023,026 B2 | 7/2018 | Snider et al. | |
| 2003/0213179 A1 | 11/2003 | Galer | |
| 2004/0020131 A1 | 2/2004 | Galer et al. | |
| 2006/0107600 A1 * | 5/2006 | Nestell | E05D 15/0621 49/413 |
| 2008/0127563 A1 | 6/2008 | Tooker | |
| 2011/0056140 A1 | 3/2011 | Lewno | |
| 2014/0047772 A1 | 2/2014 | Hulst | |
| 2015/0167372 A1 * | 6/2015 | Hulst | E05F 15/643 49/123 |
| 2017/0144511 A1 * | 5/2017 | Snider | B60J 1/1853 |
| 2020/0079186 A1 * | 3/2020 | Snider | B60J 1/007 |

FOREIGN PATENT DOCUMENTS

| | | | | |
|---|---|---|---|---|
| KR | 200480099 Y1 * | 4/2016 | | E06B 7/14 |
| WO | WO-2013043899 A1 * | 3/2013 | | E06B 7/14 |

* cited by examiner

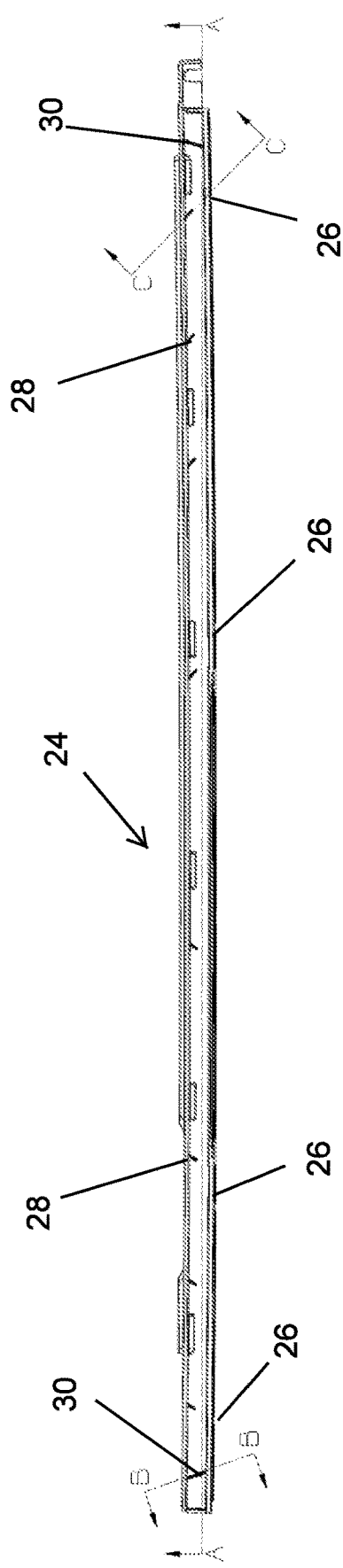
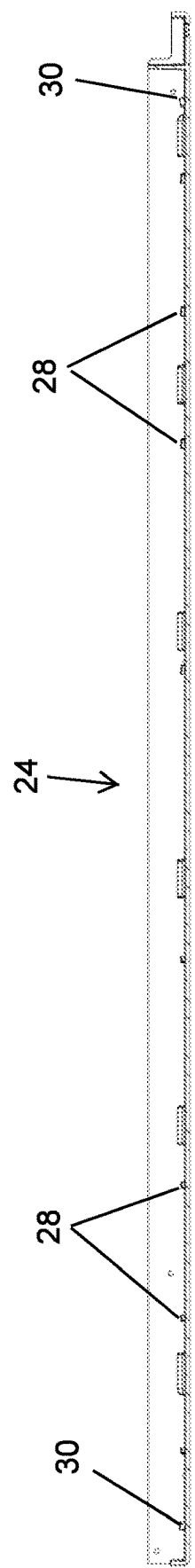
FIG. 4
FIG. 4A

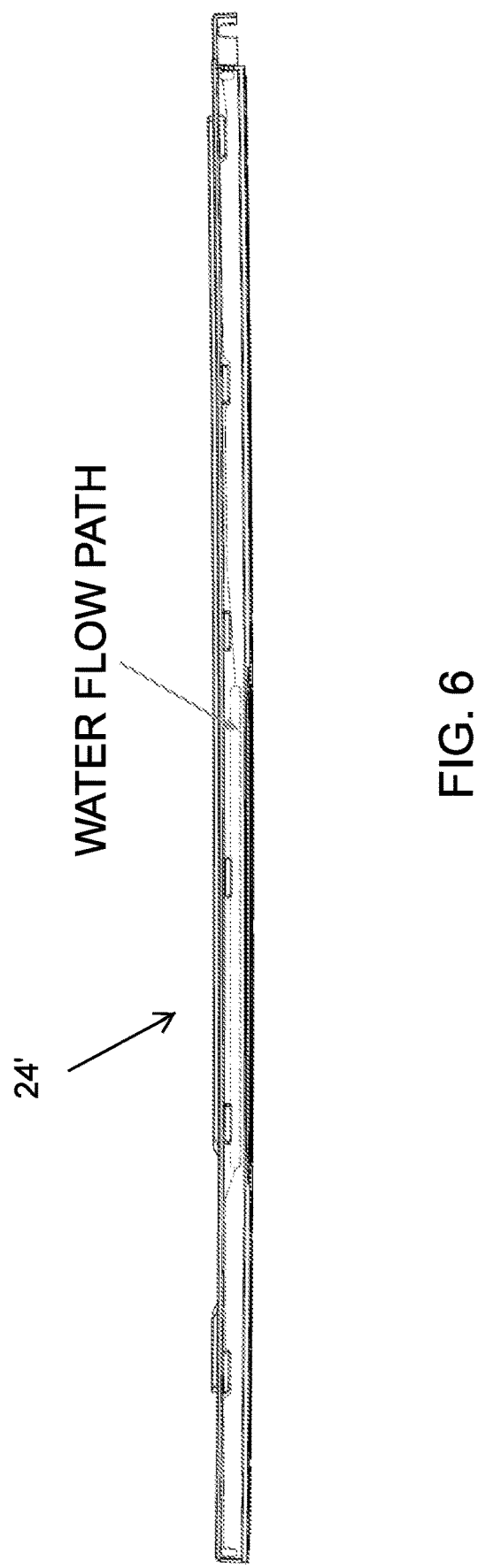

VEHICLE REAR SLIDER WINDOW ASSEMBLY WITH WATER DIVERTERS

CROSS REFERENCE TO RELATED APPLICATION

The present application claims the filing benefits of U.S. provisional application Ser. No. 62/729,439, filed Sep. 11, 2018, which is hereby incorporated herein by reference in its entirety.

FIELD OF THE INVENTION

The present invention relates to a slider window assembly for a vehicle and, more particularly, a rear slider window assembly for a vehicle and, more particularly, a rear slider window assembly for a pickup truck or the like.

BACKGROUND OF THE INVENTION

It is known to provide a slider window assembly for an opening of a vehicle, such as a rear slider window assembly for a rear opening of a pickup truck. Conventional slider window assemblies for rear openings of trucks or the like typically include three or more panels, such as two fixed window panels and a slidable window panel. The slidable window panel is supported by rails that may be adhesively bonded at the surface of the fixed window panels. The slidable window panel may be moved along the rails to open and close the window. The slidable window panel may be driven or moved by a cable drive system.

SUMMARY OF THE INVENTION

The present invention provides a rear slider window assembly that has upper and lower rails or channels adhesively attached or bonded at the inner surface of the fixed window panel or panels. The lower rail includes one or more water drainage channels or outlets that drain water that collects in and along the lower rail. The lower rail includes water diverters or guides or ribs established in the U-shaped channel of the lower rail to guide or direct or divert water present in the U-shaped channel toward the side of the channel along which the water outlets are disposed. The rear slider window assembly of the present invention thus provides enhanced water drainage from within the lower rail or channel.

These and other objects, advantages, purposes and features of the present invention will become apparent upon review of the following specification in conjunction with the drawings.

BRIEF DESCRIPTION OF THE DRAWINGS

FIG. 4 is a top plan view of the lower rail;

FIG. 4A is a sectional view of the lower rail taken along the line A-A in FIG. 4;

FIG. 6 is a top plan view of another lower rail, showing how water may flow along the U-shaped channel of the lower rail without the diverters.

DESCRIPTION OF THE PREFERRED EMBODIMENTS

Figure 1:
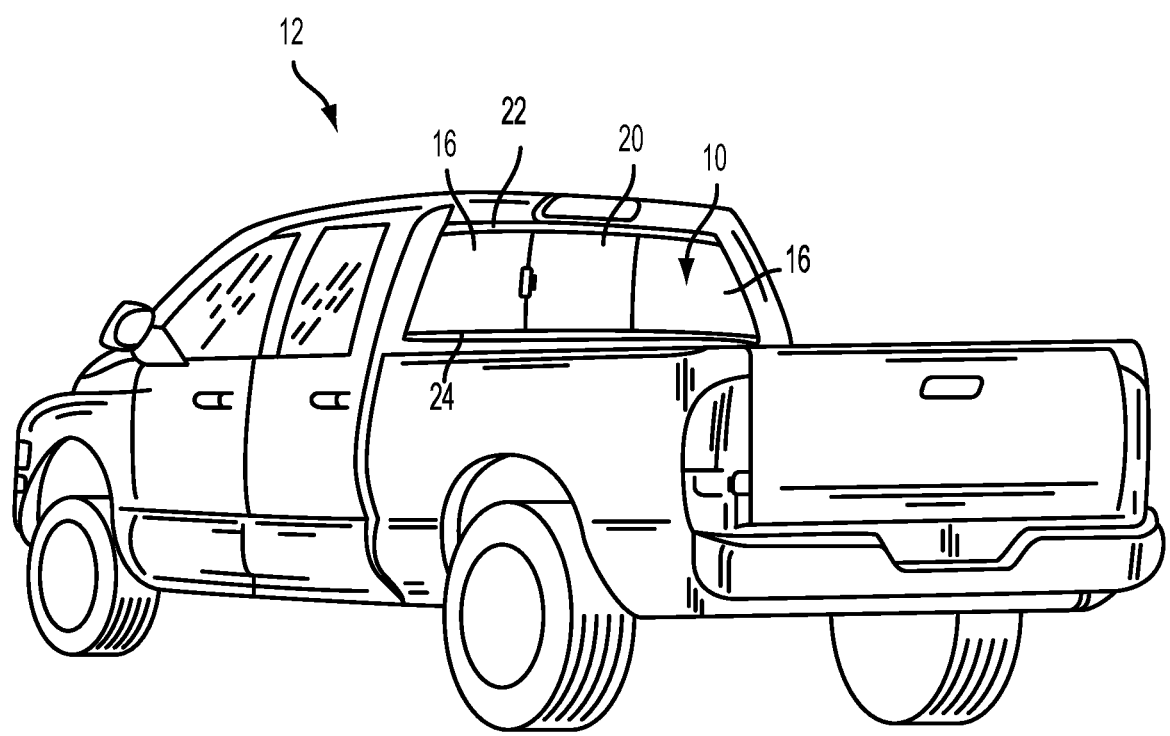
FIG. 1 is a rear perspective view of a pickup truck having a rear slider window assembly in accordance with the present invention.

Referring now to the drawings and the illustrative embodiments depicted therein, a rear slider window assembly 10 of a vehicle 12 (such as a pickup truck or the like) includes a fixed window panel 16 (or a pair of fixed window panels) having an opening established therethrough, and a movable window panel 20 that is movable relative to a frame or rails 22, 24 and fixed window panel 16 between an opened position and a closed position (FIG. 1). The rails include an upper rail 22 and a lower rail 24, with the upper and lower edge regions of the movable window panel 20 (FIG. 1) movably or slidably received in and along the respective upper and lower rails 22, 24. The lower rail 24 includes one or more water drainage openings or channels 26 (such as one or two toward each side of the window assembly), as discussed below. The lower rail includes a plurality of water diverters or ribs 28 that direct or divert or deflect water flowing in the U-shaped channel of the lower rail toward the window panel and thus toward the water drainage openings or channels 26, as also discussed below.

In the illustrated embodiment, the window assembly comprises a hole-in-glass window configuration, where a single fixed glass panel 16 has an aperture or hole or opening established therethrough to define separate spaced apart fixed window panels or panel portions. Optionally, the window assembly may comprise two fixed window panels or panel portions that are spaced apart so as to define an opening therebetween (and with upper and lower appliqués or trim or filler panels or elements disposed at the upper and lower regions of the opening and between the fixed window panels).

Upper and lower rails 22, 24 may comprise any suitable channel or rail element configured to slidably receive an upper or lower edge portion of the movable window panel. Slider or movable window panel 20 is movable along lower rail 24 and upper rail 22 to open and close the aperture or opening, such as in a manner similar to known slider window assemblies. The movable window panel 20 may include or may be disposed at a lower carrier, which may receive the lower perimeter edge region of the slider window panel 20 therein and is slidably or movably received in the channel portion of the lower rail 24.

Figure 4C:
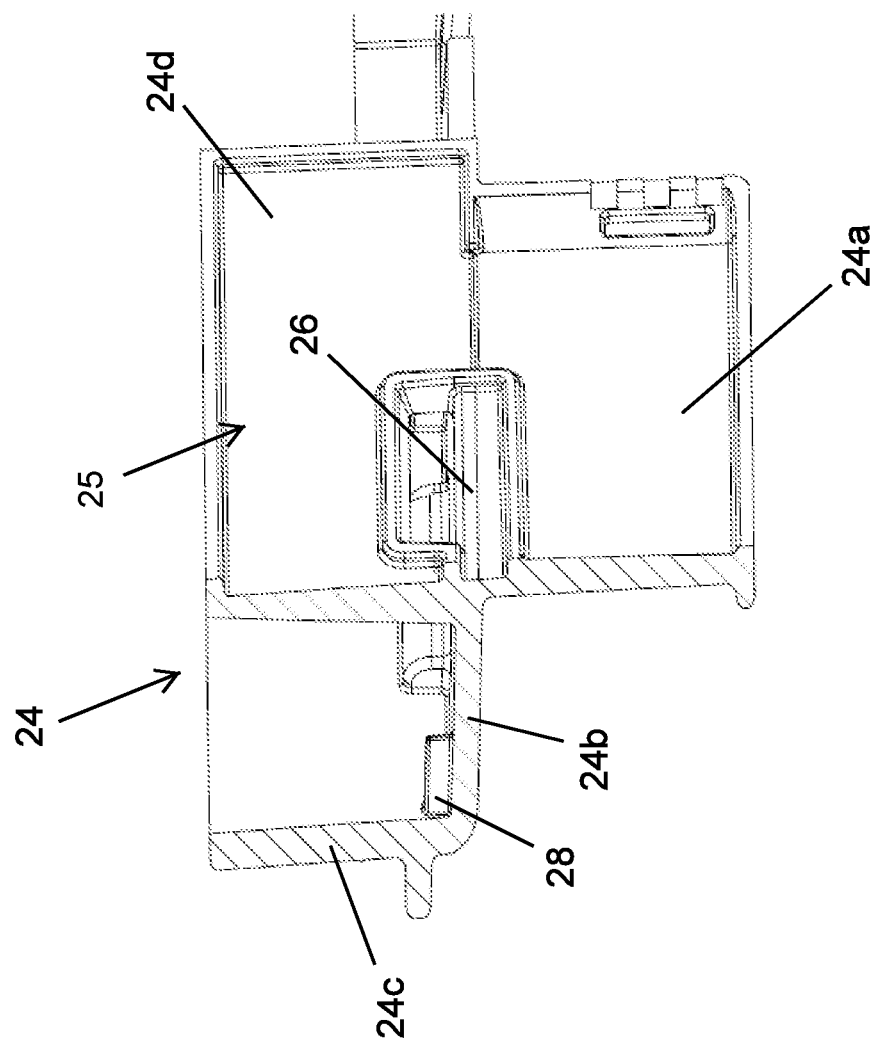
FIG. 4C is a sectional view of the lower rail taken along the line C-C in FIG. 4.

As shown in FIG. 4C, the water drainage channels or outlets 26 are formed as part of the lower rail 24 and part of a lower extension 24a of the lower rail, and provide a channel or conduit or passageway for water to flow through (between the fixed window panel and the lower rail and lower extension). The water drainage channel is established at a mounting or attaching structure 25 of the lower rail 24. The mounting structure provides a recess for receiving adhesive beads for adhesively attaching or bonding the lower rail at the fixed window panel, and has a perimeter lip that functions to establish the bond-line thickness of the adhesive that attaches the rail at the window panel. The recess/channel is defined by and between the window panel and the structure of the lower rail, with the water drainage passageway or recess/channel bounded by a wall or lip of the structure that engages the window panel to provide a closed channel through which water flows (with the perimeter lip also functioning to establish the bond-line thickness of the adhesive disposed at other recesses of the structure of the lower rail). Thus, the water drainage channels are provided between and defined by and bounded by the rail structure and the fixed window panel 16 when the lower rail is adhesively attached or bonded at the fixed window panel. The water drainage channel direct water downward or along a channel or conduit (such as shown in FIG. 4C) to direct water flow out of the U-shaped channel and out of the window assembly and the vehicle.

As shown in FIGS. 4, 4A, 4B, 4C and 5, the diverters 28 are established along the bottom wall 24b of the U-shaped channel of the lower rail 24 (such as by forming or molding the diverters as part of the injection molded plastic lower rail or such as by affixing or attaching the diverters to the bottom wall of the channel of the molded or extruded plastic lower rail) and extend at an angle from the inner wall 24c (opposite the outer wall 24d that is at the inner surface of the window panel(s) 16). The diverters are positioned to direct water that may accumulate in the channel toward the outer wall 24d, where the water drainage channels or outlets 26 are established. The opposite ends or end regions of the lower rail 24 may include angled partial walls or diverters 30 that extend fully across the U-shaped channel to limit or preclude flow of water past the walls 30 and to direct or guide the water toward the outer or closest water drainage channel or outlet 26. The diverting walls 30 are inboard of each end wall 24e of the lower rail.

The diverters and the angled walls are established at the bottom wall of the U-shaped channel and are at an acute angle relative to the inner wall 24c of the U-shaped channel. For example, the diverters may be at an angle of 45 degrees to 70 degrees, such as around 60 degrees, relative to the side wall from which they extend, and the particular angle may be selected depending on the particular location of the diverter relative to the closest water drainage opening, so the diverter is positioned to provide enhanced water direction so as to direct water flowing in the channel toward the water drainage opening. The diverters are angled one way at one side of the center region of the movable window (when closed), so that water that accumulates below the movable window panel and flows laterally outward from the center region is diverted toward the inner wall of the U-shaped channel by the diverters, which divert the water flow while still allowing the water to flow toward the laterally outboard end of the lower rail.

Figure 4B:
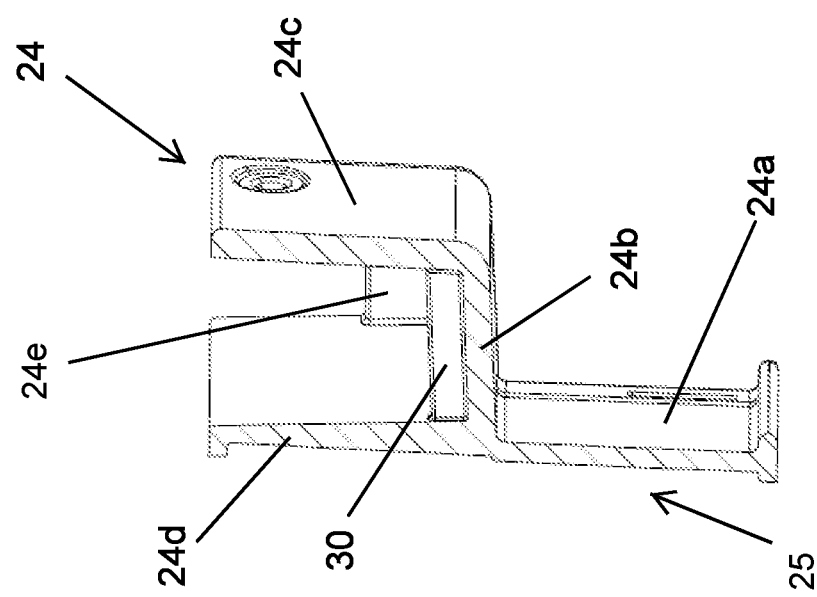
FIG. 4B is a sectional view of the lower rail taken along the line B-B in FIG. 4.

The angled end walls may also be angled at an acute angle relative to the side walls, and may be angled in an opposite direction relative to the diverters to provide the desired redirection of the water toward the outermost water drainage outlet. The diverters and end wall extend upward from the bottom wall of the U-shaped channel, but not entirely upward along the side walls. For example, the diverters may only protrude upward 5-10 mm or thereabouts, while the angled end walls may protrude upward the same amount or more (such as shown in FIG. 4B), in order to further limit or preclude water from passing the angled end wall. For example, the angled end walls may protrude upward by 5-15 mm or more. The diverters thus protrude a small amount upward in the channel so as to still provide clearance for the movable window panel to be partially received in the channel.

Figure 5:
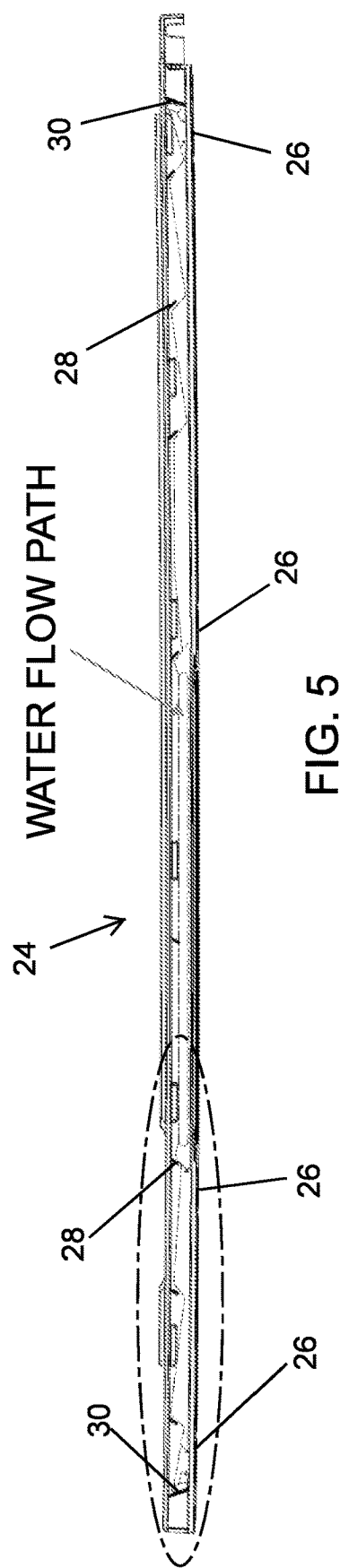
FIG. 5 is another top plan view of the lower rail of FIG. 4, showing the water flow path with the diverters in the lower rail.
Figure 5A:
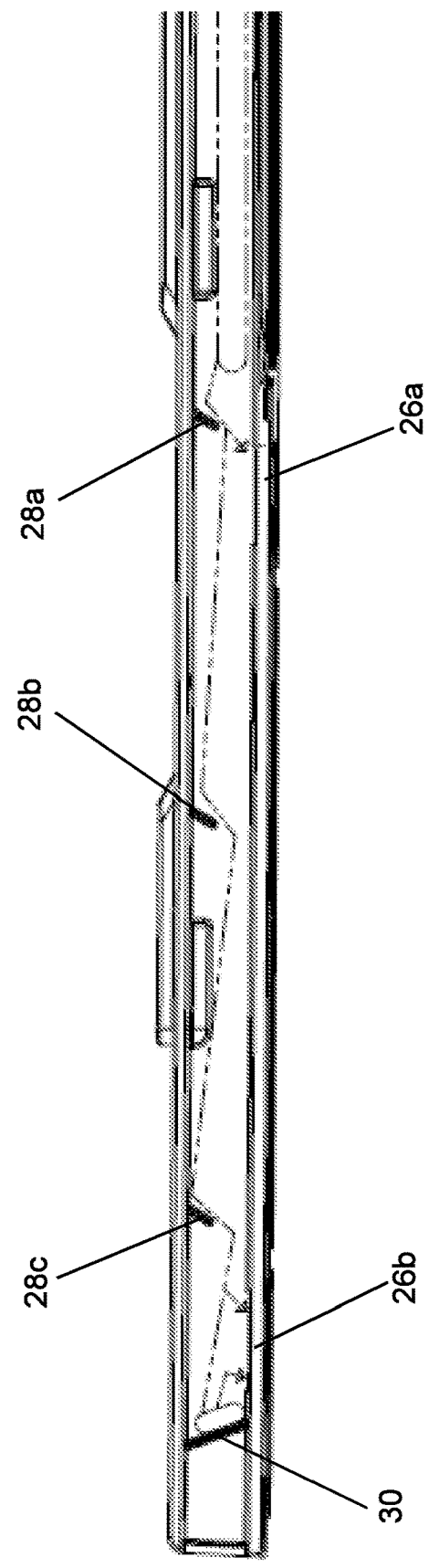
FIG. 5A is an enlarged top plan view of the area A in FIG. 5.

In the illustrated embodiment, there are four water drainage channels or outlets 26 spaced apart along the outer wall 24d of the channel of the lower rail. Thus, and such as can be seen with reference to FIGS. 5 and 5A, water that accumulates in the lower rail's channel flows laterally outward from a central region, whereby the diverters 28 direct the water in the desired manner. For example, and such as best shown in FIG. 5A, water flowing laterally outward will be directed or diverted by a first diverter 28a toward a respective water drainage outlet 26a, and will be directed or diverted by a second diverter 28b, and then a third diverter 28c toward another respective water drainage outlet 26b. Water flow that passes the outer water drainage outlet 26b will be re-directed back toward that outlet by the angled end wall 30.

For a lower rail channel that does not have the diverters or angled end walls (such as the lower rail 24' of FIG. 6), some of the water may flow along the inner wall of the channel and may collect at the outer ends of the lower rail, where it may flow or leak into the vehicle.

Therefore, the present invention provides enhanced drainage of water that may collect at and in the U-shaped channel of the lower rail. The diverters are configured to direct flow of water within the U-shaped channel toward the side of the channel that has the openings of the water drainage channels or conduits. The water drainage channels or conduits may utilize aspects of the channels or conduits described in U.S. Pat. No. 8,881,458 and/or U.S. patent application Ser. No. 16/565,527, filed Sep. 10, 2019 for VEHICLE REAR SLIDER WINDOW ASSEMBLY WITH WATER DRAINAGE CHANNEL, which published on Mar. 12, 2020 as U.S. Patent Publication US-2020-079186, which are hereby incorporated herein by reference in their entireties. For example, a plurality of diverters may be disposed along the bottom wall in the U-shaped channel to divert water toward the window panel and toward an inlet to a water drainage channel of the types described in U.S. patent application Ser. No. 16/565,527 (incorporated above).

The upper and lower rails may comprise any suitable channel element configured to slidably receive the movable window panel and may be formed via any suitable forming means. For example, the channel portions and rails may be formed via an injection molding process. The rails may comprise any suitable material or materials, such as, for example, a rigid or substantially rigid molded polymeric material (such as a polyvinylchloride material or PC-ABS or the like), and preferably a rigid polymeric material or engineered plastic material. The rails may be adhered or bonded to the respective window panels and/or sheet metal via any suitable adhesive, such as, for example, by utilizing aspects of the window assemblies described in U.S. Pat. Nos. 10,023,026; 5,551,197 and/or 5,853,895, which are hereby incorporated herein by reference in their entireties.

Figure 2:
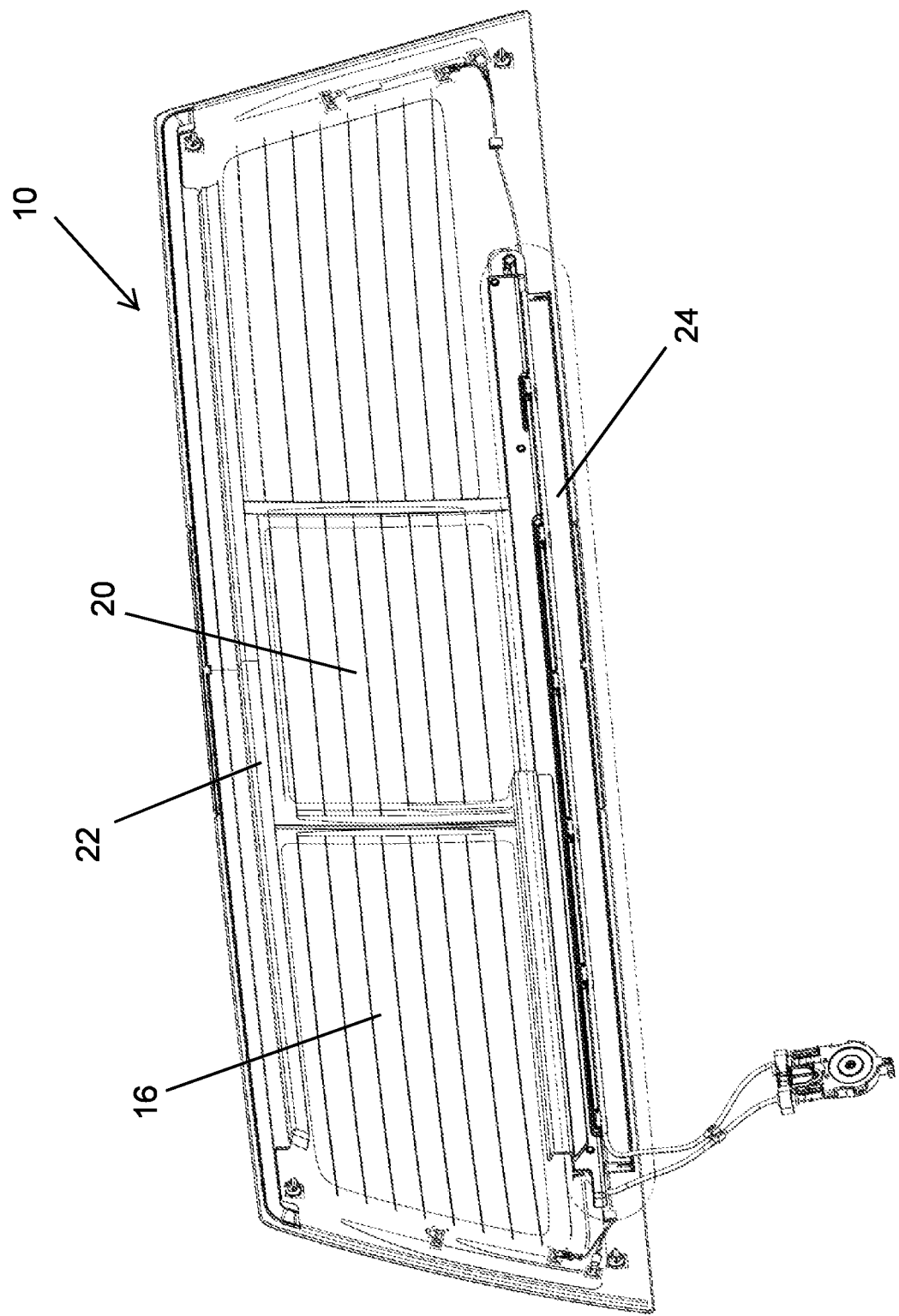
FIG. 2 is a front or interior view of the rear slider window assembly of FIG. 2.
Figure 3:
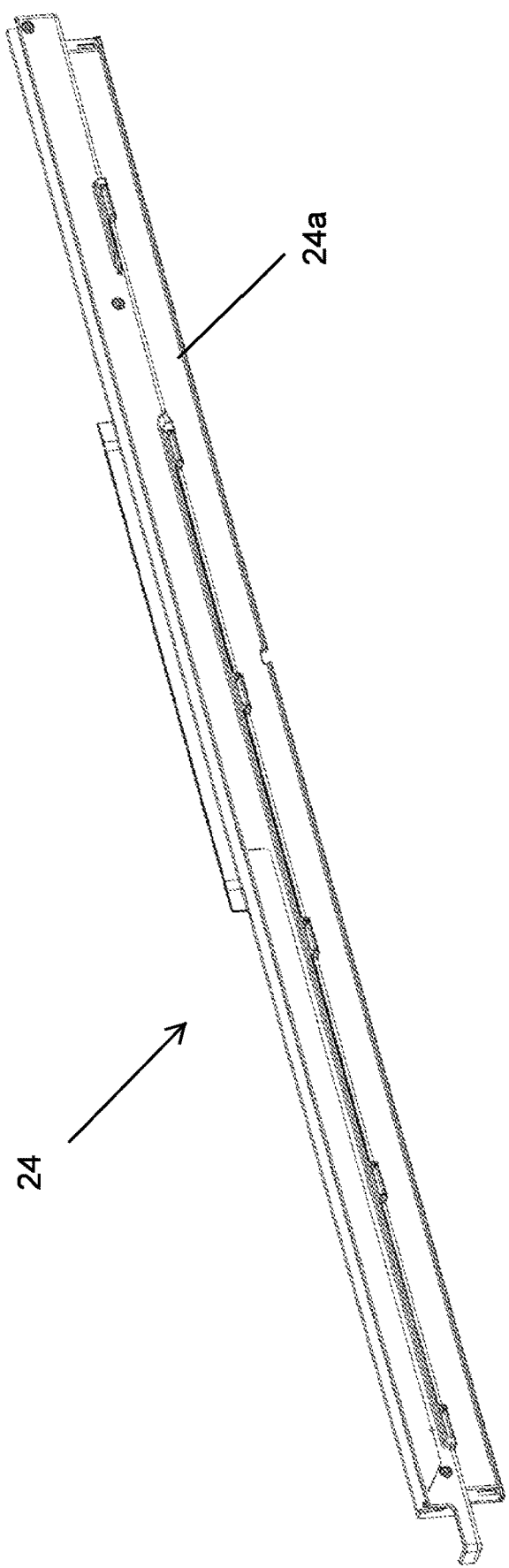
FIG. 3 is a perspective view of the lower rail.

The movable window panel may be movable between its opened and closed positions via any suitable means, such as via manual pushing or pulling at the window panel and/or in response to actuation of a drive motor of a drive motor assembly or system 36 (FIGS. 2 and 3), which may move cables or wires of cable assemblies relative to a sheath of the cable assemblies or the like to impart horizontal movement of the slider window panel 20 along the rails 22, 24. Optionally, the drive motor assembly may utilize aspects of the drive assemblies of the types described in U.S. Pat. Nos. 4,920,698; 4,995,195; 5,146,712; 5,531,046; 5,572,376; 6,955,009 and/or 7,073,293, and/or U.S. Publication Nos. US-2004-0020131 and/or US-2008-0127563, which are all hereby incorporated herein by reference in their entireties.

The benefits of embodiments of the slider window assembly of the present invention may also be realized in vehicular movable window assemblies other than a rear slider window assembly for a pickup truck or the like, such as (for example) a slider window assembly suitable for use as a movable side window for a vehicle such as a van or a bus. The window assembly may utilize aspects of the elements and window assemblies described in U.S. Pat. Nos. 8,915,018 and/or 8,881,458, which are hereby incorporated herein by reference in their entireties.

Optionally, the fixed window panel and movable window panel of the window assembly of the present invention may include one or more electrically conductive elements, such as heater grids or the like, which may be powered utilizing aspects of the window assemblies described in U.S. Pat. Nos. 8,402,695 and/or 8,881,458, which are hereby incorporated herein by reference in their entireties. The window assembly may include a heater grid on each of the fixed window panels and on the movable window panels, with a heating system that provides power to the heater grid on the movable window panel irrespective of the position of the movable window panel relative to the fixed window panel and throughout the range of movement of the movable window panel between its opened and closed positions, such as by utilizing aspects of the window assemblies described in U.S. Pat. No. 8,402,695 and/or 8,881,458, incorporated above.

Optionally, the window assembly or assemblies of the present invention may utilize aspects of the window assemblies described in U.S. Pat. Nos. 8,915,018; 8,881,458; 8,402,695; 7,073,293; 7,003,916; 6,119,401; 6,026,611; 5,996,284; 5,799,444 and/or 6,691,464, and/or U.S. Publication Nos. US-2014-0047772; US-2006-0107600; US-2008-0127563; US-2004-0020131 and/or US-2003-0213179, all of which are hereby incorporated herein by reference in their entireties.

Changes and modifications to the specifically described embodiments may be carried out without departing from the principles of the present invention, which is intended to be limited only by the scope of the appended claims, as interpreted according to the principles of patent law.

The invention claimed is:

1. A slider window assembly for a vehicle, said slider window assembly comprising:
    at least one fixed window panel, said at least one fixed window panel defining an opening;
    an upper rail and a lower rail attached at said at least one fixed window panel;
    a movable window panel that is movable along said upper rail and said lower rail, wherein said movable window panel is movable between a closed position, where said movable window panel is disposed at said opening, and an opened position, where said movable window panel is disposed at least partially along said at least one fixed window panel;
    wherein said lower rail comprises a U-shaped channel and an attaching structure for attaching said lower rail at said at least one fixed window panel;
    wherein said lower rail comprises a plurality of water drainage channels established at said attaching structure and each comprising a respective inlet at a wall of the U-shaped channel;
    a plurality of water diverters within the U-shaped channel, wherein the water diverters are configured to divert water flowing along the U-shaped channel toward respective inlets of said water drainage channels of the U-shaped channel; and
    wherein said lower rail comprises an angled end wall at an end region of the U-shaped channel, and wherein said angled end wall is disposed across the U-shaped channel at an acute angle relative to a side wall of the U-shaped channel, and wherein said angled end wall directs water toward an opposite side wall of the U-shaped channel and toward a closest one of the water drainage channels.

2. The slider window assembly of claim 1, wherein the side wall of the U-shaped channel comprises said attaching structure.

3. The slider window assembly of claim 2, wherein said water diverters direct water toward the at least one fixed window panel, whereby water flows through the inlets of said water drainage channels and out from said slider window assembly.

4. The slider window assembly of claim 1, wherein the plurality of water diverters protrude upward from a bottom wall of the U-shaped channel, and wherein said water diverters do not extend fully up the height of the U-shaped channel.

5. The slider window assembly of claim 1, wherein said lower rail comprises another angled end wall at an opposite end region of the U-shaped channel.

6. The slider window assembly of claim 5, wherein said angled end wall extends upward from a bottom wall of the U-shaped channel at the end region of the U-shaped channel, and wherein said other angled end wall extends upward from the bottom wall of the U-shaped channel at the opposite end region of the U-shaped channel.

7. The slider window assembly of claim 6, wherein said angled end wall does not extend fully up the height of the U-shaped channel at the end region of the U-shaped channel, and wherein said other angled end wall does not extend fully up the height of the U-shaped channel at the opposite end region of the U-shaped channel.

8. The slider window assembly of claim 1, wherein said at least one fixed window panel comprises a single fixed window panel having an opening therethrough.

9. The slider window assembly of claim 1, wherein said at least one fixed window panel comprises first and second fixed window panels defining an opening therebetween.

10. A slider window assembly for a vehicle, said slider window assembly comprising:
    at least one fixed window panel, said at least one fixed window panel defining an opening;
    an upper rail and a lower rail attached at said at least one fixed window panel;
    a movable window panel that is movable along said upper rail and said lower rail, wherein said movable window panel is movable between a closed position, where said movable window panel is disposed at said opening, and an opened position, where said movable window panel is disposed at least partially along said at least one fixed window panel;
    wherein said lower rail comprises a U-shaped channel having a bottom wall and first and second side walls, and wherein the first side wall opposes said at least one fixed window panel;
    wherein said lower rail comprises a plurality of water drainage channels each comprising a respective inlet at the bottom wall and/or the first side wall of the U-shaped channel;
    a plurality of water diverters within the U-shaped channel and protruding upward from the bottom wall of the U-shaped channel;
    wherein each of said water diverters is at an acute angle relative to the second side wall of the U-shaped channel and is configured to divert water flowing along the U-shaped channel toward the first side wall of the U-shaped channel; and wherein said lower rail comprises an angled end wall at an end region of the U-shaped channel, and wherein said angled end wall is disposed across the bottom wall of the U-shaped channel at an acute angle relative to the first and second side walls of the U-shaped channel, and wherein said angled end wall directs water toward a closest one of the water drainage channels.

11. The slider window assembly of claim 10, wherein each of said water diverters is configured to divert water flowing along the U-shaped channel toward a respective inlet of said water drainage channels of the U-shaped channel.

12. The slider window assembly of claim 10, wherein the first side wall of the U-shaped channel comprises attaching structure for attaching said lower rail at said at least one fixed window panel.

13. The slider window assembly of claim 10, wherein said water diverters direct water toward the at least one fixed window panel, whereby water flows through the inlets of said water drainage channels and out from said slider window assembly.

14. The slider window assembly of claim 10, wherein said water diverters do not extend fully up the height of the U-shaped channel.

15. The slider window assembly of claim 10, wherein said lower rail comprises another angled end wall at an opposite end region of the U-shaped channel.

16. The slider window assembly of claim 15, wherein said angled end wall does not extend fully up the height of the U-shaped channel at the end region of the U-shaped channel, and wherein said other angled end wall does not extend fully up the height of the U-shaped channel at the opposite end region of the U-shaped channel.

17. The slider window assembly of claim 10, wherein said at least one fixed window panel comprises a single fixed window panel having an opening therethrough.

18. The slider window assembly of claim 10, wherein said at least one fixed window panel comprises first and second fixed window panels defining an opening therebetween.

* * * * *